United States Patent [19]

Nishiwaki et al.

[11] Patent Number: 5,159,650
[45] Date of Patent: Oct. 27, 1992

[54] OPTICAL DISK APPARATUS FOR RECORDING AND REPRODUCING ULTRA-HIGH DENSITY SIGNALS

[75] Inventors: Seiji Nishiwaki, Katano; Shinji Uchida, Osaka; Junichi Asada, Ibaraki, all of Japan

[73] Assignee: Matsushita Electric Industrial Co., Ltd., Osaka, Japan

[21] Appl. No.: 655,356

[22] PCT Filed: Jun. 28, 1990

[86] PCT No.: PCT/JP90/00843
§ 371 Date: Feb. 21, 1991
§ 102(e) Date: Feb. 21, 1991

[87] PCT Pub. No.: WO91/00596
PCT Pub. Date: Oct. 1, 1991

[30] Foreign Application Priority Data
Jun. 30, 1989 [JP] Japan ................. 1-170123

[51] Int. Cl.⁵ ........................... G02B 6/00; G02B 6/36
[52] U.S. Cl. ................................. 385/37; 369/44.11
[58] Field of Search .......................... 385/35-37; 369/44.14, 44.12; 250/227

[56] References Cited

U.S. PATENT DOCUMENTS 4,978,187 12/1990 Minemura et al. ............ 385/37 X
4,983,009 1/1991 Musk ........................... 385/35
4,991,919 2/1991 Nishiwaki et al. ............... 385/37

FOREIGN PATENT DOCUMENTS 0130026 1/1985 European Pat. Off. .
0360466 3/1990 European Pat. Off. .
63-164034 7/1988 Japan .

Primary Examiner—Akm E. Ullah
Attorney, Agent, or Firm—Stevens, Davis, Miller & Mosher

[57] ABSTRACT

An optical disc apparatus includes an optical disk which satisfies the relationship of $$(A_s\cos\phi_s - 1) \geq -D_s(A_s^2 - 2A_s\cos\phi_s + 1)^2/4\lambda^2$$
or
$$A_s\cos\phi_s = 1$$

where $A_s$, $\phi_s$ are the amplitude reflectivity ratio and the phase difference between the regions within and out of a signal mark (27, 28) on a signal surface (16) of the optical disc, $D_s$ is the area of the signal mark (27, 28) and $\lambda$ is the wavelength of a light source (8), and the light reflected from signal surface (16) is input-coupled by a grating coupler (4A, 4B) into a waveguide layer to propagate as wave-guided light (18A, 18B), radiated at the end of the wave-guiding layer (3A, 3B) and received by a light detector (6A, 6B) so that a control signal and a reproduced signal can be obtained from the detector.

2 Claims, 4 Drawing Sheets

OPTICAL DISK APPARATUS FOR RECORDING AND REPRODUCING ULTRA-HIGH DENSITY SIGNALS

TECHNICAL FIELD

This invention relates particularly to an optical disc apparatus capable of satisfactorily reproducing an extremely high-density recorded signal.

BACKGROUND OF THE INVENTION

A conventional optical disk apparatus and the reproduction of a signal recorded on a disc will be described with reference to the accompanying drawings.

In the conventional optical disk apparatus as shown in FIG. 1, the light emitted from a semiconductor laser 8 is made parallel light by a condenser 9 and passed through a half-mirror 30 and through a focus lens 31 to be focused on a reflecting surface 16 of an optical disk on which signal marks are formed. Part of the incident light to the reflecting surface is reflected from the reflecting surface 16, and the reflected light which includes the information of the signal recorded on the disc is conducted again through the focus lens 31 to the half-mirror 30 and reflected therefrom into a light detector 32, where the recorded signal on the disc is detected. This detected signal is amplified by an amplifier 33.

The density of the recorded signal which can be reproduced by this conventional optical disc apparatus is limited as will be mentioned below.

The disc has a large number of very small signal marks recorded thereon. These signal marks can be formed in various modes; for example, very small regions on the recording film are heated to change the phase of the film material and thereby to change an optical constant of the very small regions, very small pits or bumps are formed on the disc, and so on.

The information recorded in these signal marks can be reproduced by irradiating a very small spot of focused laser light on the signal marks and receiving the reflected light therefrom.

In the optical disc apparatus having the arrangement shown in FIG. 1, when the wavelength of the laser 8 is $\lambda = 780$ nm, the numerical aperture of the focus lens 31 is NA=0.50, and the intensity of the laser is constant within the aperture, then the light intensity distribution $I(\xi,\eta)$ of the light irradiated on the reflecting surface (($\xi,\eta$) coordinates system) of the disc is indicated in FIG. 2 by a curve (a). Here, if $u(\xi,\eta)$ is the light amplitude distribution, the light intensity distribution can be expressed as $I(\xi,\eta) = |u(\xi,\eta)|^2$.

In the following consideration of reflection from the reflecting surface of the disc, it is assumed that a very small and single encircled mark D is formed on the reflecting surface of the disc and the coordinates of the center, the amplitude reflectivity ratio and the phase difference of the signal mark are represented by ($\xi_3, \eta_c$), $A_s$ and $\phi_s$, respectively.

The reflection function is given by the following equation:

$$R(\xi,\eta) = \begin{cases} A_s \exp(i\phi_s) & \ldots (\xi,\eta) \in D \\ 1 & \ldots (\xi,\eta) \notin D \end{cases} \quad (1)$$

The above equation can be rearranged by use of the delta function $\delta$ as $$R(\xi,\eta) = 1 + \int\int_{(\xi_m,\eta_m)\in D} A_R \delta(\xi - \xi_m, \eta - \eta_m) d\xi d\eta \quad (2)$$

where, $A_R = A_s \exp(i\phi_s) - 1$ \quad (3)

The integration term of the equation (2) is rewritten in a discrete form as in the equation (4):

$$R(\xi,\eta) = 1 + \sum_{m=1}^{n} A_R \delta(\xi - \xi_m, \eta - \eta_m) D_s/n \quad (4)$$

where D is the area of the signal mark D, and n is the number of a group of points ($\xi_m, \eta_m$) and large enough to cover most of the region D.

When the signal mark D is narrower than the focused beam spot (for example, the diameter ratio is about ½ or below), $u(\xi_m, \eta_m)$ (m=1, 2, ..., n) can be represented by the value at the center ($\xi_c, \eta_c$) of the signal mark D. Moreover, the aperture is assumed to be in the range of $\alpha \leq \theta \beta$ ($\theta$ is the angle between the optical axis and the light ray) as viewed from the focal point F. Here, if $\alpha = 0$, the aperture is circular, and if $\alpha > 0$, the aperture is of a ring band.

The amount of reflected light detected by the light detector (or focused by the focus lens) is given by the following equation:

$$T(A_R, \xi_c, \eta_c) = T_0 + D_s(A_R + A_R^*)I(\xi_c, \eta_c) + (2\lambda I_{-1} D_s^2/\pi^2)|A_R|^2 I(\xi_c, \eta_c) \quad (5)$$

where the sign * represents the conjugate complex number, and $T_{100}$ and $I_n$ are respectively defined by the following equations:

$$T_0 = \int\int_{-\infty}^{+\infty} I(\xi,\eta) d\xi d\eta \quad (6)$$

$$I_n = \int_{\alpha}^{\beta} \sin\theta/\cos^n\theta \, d\theta \quad (7)$$

Thus, the standardized reproduced signal amplitude $\Delta P$ (the difference of the amounts of detected light corresponding to the presence and absence of the signal mark) is given as:

$$\Delta P(A_R, \xi_c, \eta_c) = T(A_R, \xi_c, \eta_c)/T_0 - 1 = \\ 2(D_s I(\xi_c, \eta_c, z)/T_0) \times \\ \{-(1 - A_s \cos\phi_s) + (\pi 1_{-1} D_s/\lambda^2)(A_s^2 - 2A_s \cos\phi_s + 1)\} \quad (8)$$

In order to satisfactorily reproduce a signal from one signal mark and to prevent the so-called cross-talk, it is necessary to separate the other adjacent signal marks from the reproducing signal mark by a certain distance. If, for example, the wavelength is $\lambda = 780$ nm and the aperture is a circular aperture of NA=0.50, this distance is found as follows.

If, now, the center of the beam spot is at the coordinates (0, 0), and the signal mark is at the coordinates ($\xi_c, \eta_c$) respectively, the ratio of the cross-talk signal to the detected signal can be expressed by $$\Delta P(A_R, \xi_c, \eta_c)/\Delta P(A_R, 0, 0) = I(\xi_c, \eta_c)/I(0, 0) \quad (9)$$

Thus, from the curve (a) in FIG. 2, it will be found that in order to reduce the cross talk to $-30$ dB or below, or to satisfy $\Delta P(A_R,\xi_c,\eta_c)/\Delta P(A_R, O,O) \leq 0.30$ $(\xi_c^2+\eta_c^2)^{\frac{1}{2}} \geq 0.86$ μm must be satisfied. In other words, if the diameter of the signal mark is represented by $d_D$, the distance between the adjacent marks must be $(d_D/2+0.86)$ μm or above Generally in the recording optical disc, the diameter of the signal mark is determined by the spot diameter d of the laser beam, or substantially $d_D \approx d/2$. The general spot diameter d of the focused light (or the diameter of the first dark line ring of an Airy disc) is given as $d = 1.22 \lambda/NA$.

Thus, when $\lambda = 780$ nm and NA$=0.50$, the track density up to 1.3 μm and the line density up to 1.3 μm are allowed as the limit of satisfactory reproduction of the signal, and hence these values are the upper limit of the actual signal density of the optical disc.

The idea that the signal density is increased by using the ring band shaped aperture for reducing the spot diameter d is not realistic. The reason for this is as follows. The curve (b) in FIG. 2 shows the light intensity distribution for the case in which the aperture is of a ring band satisfying $\sin \theta = 0.44$ to $0.60$. The diameter of the main lobe is decreased, but the peak value of the first side lobe is increased to about 14% of the peak of the main lobe. The signal density depends on the spot diameter d of the main lobe as described above, and thus it appears that the signal density can be increased by use of the ring band shaped aperture in which case the spot diameter d is decreased. However, in practice, the increase of the peak of the first side lobe causes the crosstalk to increase, thus deteriorating the signal reproduction ability. As a result, when the reproduction is considered, the signal density cannot be increased.

In addition, if the wavelength of the laser source 8 is decreased, and if the numerical aperture of the focus lens 31 is increased, the signal density can be increased without deteriorating the signal reproduction ability.

However, the decrease of the wavelength of the light source, particularly of the semiconductor laser, is extremely difficult. It will take a considerably long time to develop a large-power short-wavelength laser.

Moreover, as the numerical aperture of the focus lens is increased, (1) the focal depth becomes small and the allowance as to the errors in the tilt angle of the lens or the disc and in the defocus is narrower, and (2) the focus lens becomes large and heavy because the working distance cannot be decreased for preventing the contact between the disc base and the lens, thus deteriorating the frequency characteristics of the focus lens drive mechanism (pickup). Accordingly, the increase of the numerical aperture of the focus lens is limited.

Thus, in the conventional optical disc apparatus, it is practically impossible to reproduce a signal which is recorded at a high density exceeding the diffraction limit of light.

DISCLOSURE OF THE INVENTION

This invention, in view of such problems, is directed to providing an optical disk apparatus capable of satisfactorily reproducing a signal which is recorded at a higher density than in the conventional art, exceeding the diffraction limit of light. This apparatus comprises a laser light source of wavelength $\lambda$, a recording medium having a signal surface on which small signal marks are formed, and coupling means for focusing the laser light on the signal mark and receiving and converting the reflected light from the signal mark into wave guided light, and has the feature that when the amplitude reflectivity ratio, the phase difference and the area of the signal mark are represented by $A_s$, $\phi$ and $D_s$, respectively, the expression of $$(A_x\cos \phi_x - 1) \leq -D_s(A_s^2 - 2A_x\cos \phi_s + 1)^2/4\lambda^2$$

or $$A_s\cos \phi_s = 1$$

is satisfied.

In addition, this apparatus has the feature that the coupling means is formed of a periodic structure which is formed in concentric circles or in a spiral shape on a wave guiding layer.

BEST MODE OF CARRYING OUT THE INVENTION

Figure 3:
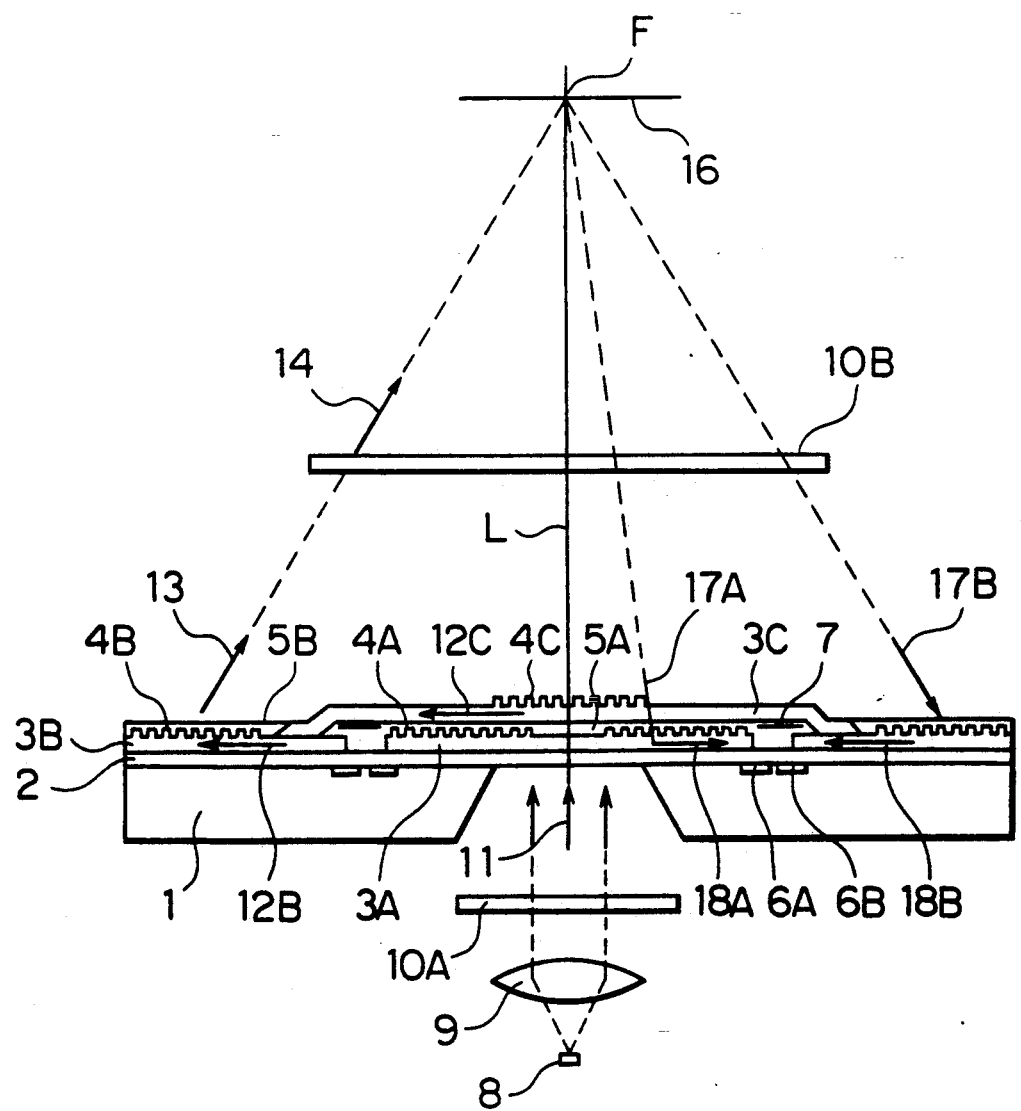
FIG. 3 is a cross-sectional diagram of an optical disc apparatus of an embodiment.

Embodiments of the invention will be described with reference to FIGS. 3 to 6. FIG. 3 is a cross-sectional diagram of an optical disc apparatus of an embodiment.

Referring to FIG. 3, a transparent layer 2 of a low-refractive index material is formed on a silicon Si base 1, and then a transparent layer of a high-refractive index material is formed on the former transparent layer 2. The transparent layer is formed of a circular portion 3A and a ring-band portion 3B surrounding this circular portion 3A, with these portions being disconnected. The transparent layer 3A and 3B have formed thereon couplers 4A and 4B of periodic structure, or gratings of concentric circles or a spiral shape around the center axis L, or the couplers are formed on the concentric circular region (or a ring-band region) and the ring-band region around the center axis L, respectively.

Moreover, a transparent layer 3C of a high refractive index is formed over the surface of the transparent layer 3A interposing a transparent layer 5A of a low refractive index, and the transparent layer 3C contact the transparent layer 3B on the inner peripheral side regions of the coupler 4B. A coupler 4C formed of a concentric circular or spiral grating around the center axis L is formed on the concentric circular regions around the center axis L of the surface of the transparent layer 3C. A transparent layer 5B of a low refractive index is formed on the surface of the transparent layer 3B to cover the region of the coupler 4B. The refractive index of the transparent layer 5B is equal to that of the transparent layer 5A. In the Si base 1 at the positions corresponding to the discontinuous area between the transparent layers 3A and 3B, there are formed light detectors 6A and 6B (6A lies on the inner peripheral side of 6B). A reflecting film 7 is formed within the transparent layer 5A to cover the detectors 6A and 6B and the one-side surfaces of transparent layers 3A and 3B. The Si base 1 has an opening formed at around the center axis by etching or the like.

The linearly polarized light emitted from the semiconductor laser 8 is made to be parallel by the condenser 9, and then converted by a polarized light converting element 10A into light 11 of the circumferentially polarized light of which the electric field vector is in the tangential direction to a circle having its center on the straight line L, or of the radially polarized light of which the electric field vector is in the radius vector direction. The converted light 11 is input into the waveguide layer 3C so as to be coupled by the coupler 4C with the wave-guided light 12C of TE mode (or TM mode) propagating within the wave-guide layer 3C toward the outer periphery. The wave-guided light 12C reaches the outermost peripheral region of the waveguide layer 3C, and there enters into the wave-guide layer 3B to propagate as wave-guided light 12B. The wave-guided light 12B is radiated as circumferentially polarized light (or radially polarized light) 13 by the coupler 4B and passed through a polarization converting element 10B to be converted into linearly polarized light 14, and then focused at a point F on a reflecting surface 16 of an optical disc 15.

The reflected light from the reflecting surface 16 is again passed through the polarizing element 10B to be converted into circumferentially polarized light (or radially polarized light) 17A, 17B, which is then input into the wave-guide layer 3A, 3B by the couplers 4A and 4B to be coupled with wave-guided light. The light in the wave-guide layer propagates as wave-guided light 18A, 18B of TE mode (or TM mode) in the outer peripheral and inner peripheral direction, respectively. The wave-guided light 18A, 18B is both radiated at the outermost end and innermost end of the wave-guide layer 3A, 3B, and received by the light detectors 6A, 6B. The reflecting films 7 reflect the radiated light from the ends of the wave-guide layers 3A, 3B into the light detectors 6A, 6B, while they prevent the scattered light and disturbed light of the wave-guided light 12C to leak into the light detectors 6A, 6B.

Figure 4:
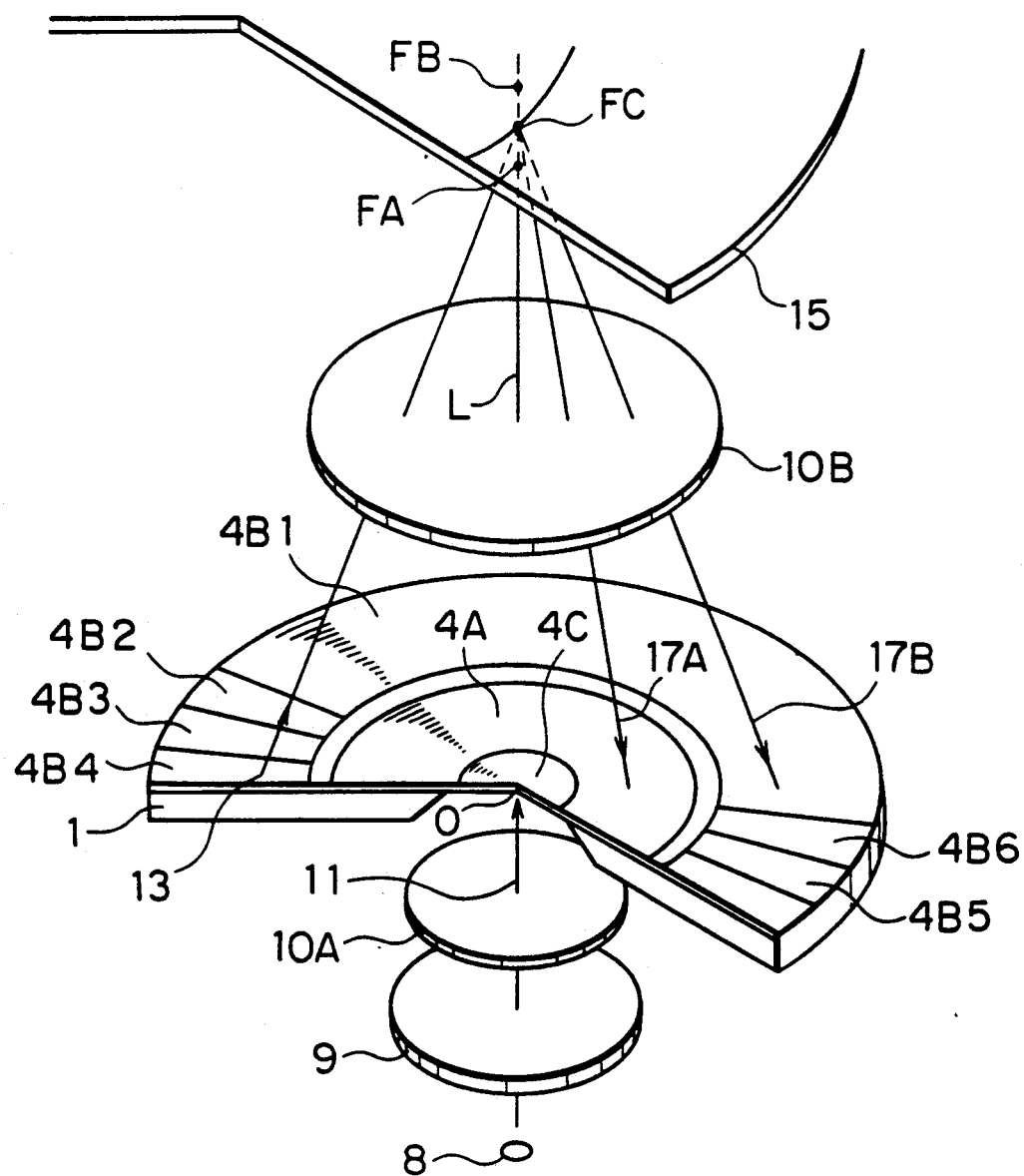
FIG. 4 shows an external appearance of the embodiment of an optical disc apparatus of the invention.

FIG. 4 shows a partially cut-away diagram of the optical disc apparatus of this embodiment. The grating coupler 4B is divided into 6 regions, or 4B1, 4B2, 4B3, 4B4, 4B5 and 4B6 by three straight lines passing through the center 0. The couplers 4B1 and 4B4 lie at opposite positions around the center 0, and the radiated light therefrom is focused at a point FC.

The couplers 4B2 and 4B5, 4B3 and 4B6 lie at opposite positions around the center 0, and the radiated light therefrom is focused at a point FA, FB on the center axis L, respectively. The point FC is approximately the center of the points FA and FB.

The focus error signal is detected from the difference between the amounts of coupled light at the couplers 4B2, 4B5 and 4B3, 4B6, and the reproduced signal is detected from the sum of the amounts of coupled light at the couplers 4B1, 4B4, 4A.

Figure 5:
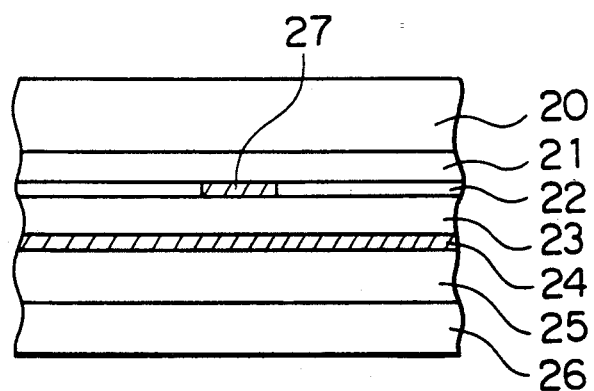
FIG. 5 is a cross-sectional diagram of the optical disc in this embodiment.

FIG. 5 is a cross-sectional diagram of the optical disc of the embodiment of this invention. The optical disc has a multi-layer film of a dielectric layer 21, an active layer 22, a dielectric layer 23 and a reflecting layer 24 formed on the surface of a transparent base 20 and has a transparent base 26 cemented to the reflecting surface 24 with an adhering layer 25. The active layer 22 is made of a material of which the optical constant is change by heat, such as the recording film of the phase-changed type optical disc. Shown at 27 is the signal mark which is formed by irradiating the focused light on the active layer 22 and hence by heating.

The reflection function to the incident light from the transparent base 20 side with regard to both the phase and amplitude is not the same on the inner and outer regions of the signal mark. Thus, the dielectric layers 21, 23, the active layer 22 and the reflection layer 24 are properly designed in the thickness and optical constants to satisfy $$(A_s \cos \phi_s - 1)^2 \geq -D_s(A_s^2 - 2A_s\cos\phi_s + 1)^2/4\lambda^2 \quad (10)$$

or $$A_s \cos \phi_s = 1 \quad (11)$$

where $A_s$, $\phi_s$ is the amplitude reflection ratio and phase difference between the inner and outer region of the signal mark, and $D_s$ is the area of the signal mark 27, and $\lambda$ is the wavelength of the light source.

In this embodiment, when the complex amplitude distribution immediately after the radiation from the coupler is represented by W(x, y), and the complex amplitude distribution of the reflected light within the same surface (coupler surface) by r(x, y), the coupling efficiency of the reflected light to the wave-guided light is approximately proportional to $|S|^2$, where $$S = \int\int_{-\infty}^{+\infty} W(x, y) \, r(x, y) dx dy \quad (12)$$

By using the complex amplitude distribution $u(\xi,\eta)$ on the reflecting surface, it is possible to rearrange Eq. (12) into $$S = \int\int_{-\infty}^{+\infty} u^2(\xi, \eta) R(\xi, \eta) d\xi d\eta \quad (13)$$

When the signal mark D is smaller than the beam spot on the reflection surface, $u(\xi_m,\eta_m)$ (m = 1, 2, . . . , n) can be represented by the value at the center $(\xi_c,\eta_c)$ of the signal mark D. Thus, the standardized amount of change $\Delta P$ of the input-coupled wave-guided light value, which accompanies the presence and absence of the signal mark, that is the reproduced signal amplitude, is given by the following equation:

$$\Delta P(A_R, \xi_c, \eta_c) = |S(A_R, \xi_c, \eta_c)/S_0|^2 - 1 = \quad (14)$$

$$|1 + D_sA_R u^2(\xi_c, \eta_c)/S_0|^2 - 1$$

where $$S_0 = \int\int_{-\infty}^{+\infty} u^2(\xi, \eta) d\xi d\eta \quad (15)$$

When the aperture shape is of a ring band satisfying the condition of $\alpha \leq \theta \leq \beta$ ($\theta$ is the angle between the optical axis and the light ray) as viewed from the focal point F, the pupil function P (x, y) of the coupler can be expressed as $$P(x, y) = \begin{cases} 1 \ldots f\tan\alpha \leq (x^2 - y^2)^{\frac{1}{2}} \leq f\tan\beta \\ 0 \ldots \text{other than the above} \end{cases} \quad (16)$$

When the amplitude of the radiated light is expressed by $$|W(x,y)| = P(x,y)\cos^2\theta,$$

equation (14) can be rearranged as $$\Delta P(A_R, \xi_c, \eta_c) = (D_s/2\pi f^2 I_{-1}) I(\xi_c, \eta_c) \times \{A_R + A_R^* + (D_s/2\pi f^2 I_{-1})|A|^2 I(\xi_c, \eta_c)\} \quad (17)$$

Thus, as in the conventional art, if the center of the beam spot is located at the coordinates (0, 0), and the center of the signal mark lies at the coordinates $\xi_c\eta_c$), the cross-talk of signal in this embodiment can be given by the following equation:

$$\Delta P(A_R, \xi_c, \eta_c)/\Delta P(A_R, 0, 0) = \{I(\xi_c, \eta_c)/I(0, 0)\} \times \quad (18)$$
$$\{A_R + A_R^* + (2\pi I_{-1}D_s/\lambda^2)|A_R|^2 I(\xi_c, \eta_c)/I(0, 0)\}/\{A_R + A_R^* + (2\pi I_{-1}D_s/\lambda^2)|A_R|^2\}$$

When $I(\xi_c,\eta_c)0,0/I(0,0)<1$, the above equation can be approximated into $$\Delta P(A_R,\xi_c,\eta_c)/\Delta P(A_R,0,0) = I(\xi_c,\eta_c)/I(0,0z)\{1+D_c(2\pi I_{-1}D_s/\pi^2)\} \quad (19)$$

where $D_c = |A_R|^2/(A_R+A_R^*)$ \quad (20)

Thus, if the condition of $$1/D_c \leq -\pi I_{-1}D_s/\pi^2 \quad (21)$$

is satisfied, the signal cross-talk is smaller than the light distribution intensity ratio $I(\xi_c,\eta_c)/I(O,O)$ at the signal mark position, and the cross-talk is decreased more, the larger the $|D_c|$. Particularly, if at the signal mark on the reflecting surface, the equation of $$A_R + A_R^* = 0 \quad (22)$$

is satisfied, the equation (18) can be rearranged as $$\Delta P(A_R, \xi_c, \eta_c)/\Delta P(A_R, 0,0) = \{I(\xi_c,\eta_c)/I(0,0)\}^2 \quad (23)$$

When the aperture of the coupler is of a circular shape and satisfies NA=0.5 (sin $\alpha=0$, sin $\beta=0.5$), $\pi I_{-1} \sim \frac{1}{2}$ is satisfied from Eq. (7), and Eq. (21) can be rearranged approximately into Eq. (10). Also, Eq. (22) coincides with Eq. (11). If the signal mark satisfies Eq. (10), the cross-talk can be remarkably reduced. Particularly when Eq. (11) is satisfied, the cross-talk equals the square of the cross-talk (see Eq. (9)) in the conventional art using the condenser, and thus can be remarkably reduced. When Eq. (11) is satisfied, the cross-talk is $-30$ dB or less, or the condition for $\Delta P(A_R,\xi_c,\eta_c)\Delta P(A_R,0,0)\leq 0.03$ is $I(\xi_c,\eta_c)/I(0,0)\leq 0.18$, and from the curve (a) in FIG. 2 $(\xi_c^2+\eta_c^2)^{\frac{1}{2}}\leq 0.59$ $\mu$m should be satisfied. In other words, if the diameter of the signal mark is represented by $d_D$, the distance between the adjacent signal marks should be selected to be $(d_D/2+0.59)$ $\mu$m or more. When $d_D$ is selected to be the same value in the conventional art, or 0.95 $\mu$m, the limit of the track density and line density can be compressed up to 1.07 $\mu$m. This value exceeds the limit value in the conventional art, or it is possible to reproduce the signal recorded at a density exceeding the diffraction limit of light.

Figure 1:
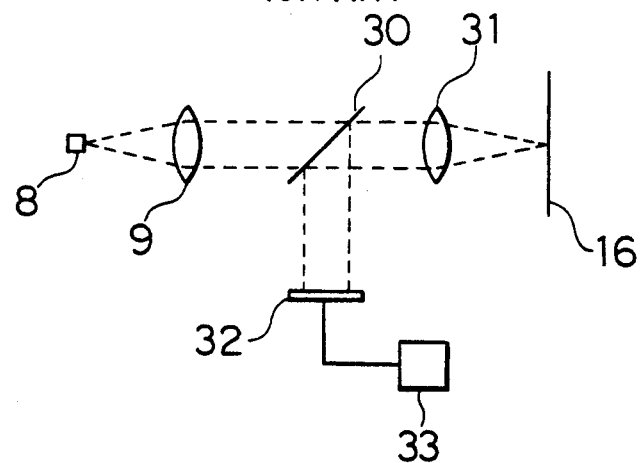
FIG. 1 shows the construction of a conventional optical disc apparatus.
Figure 2:
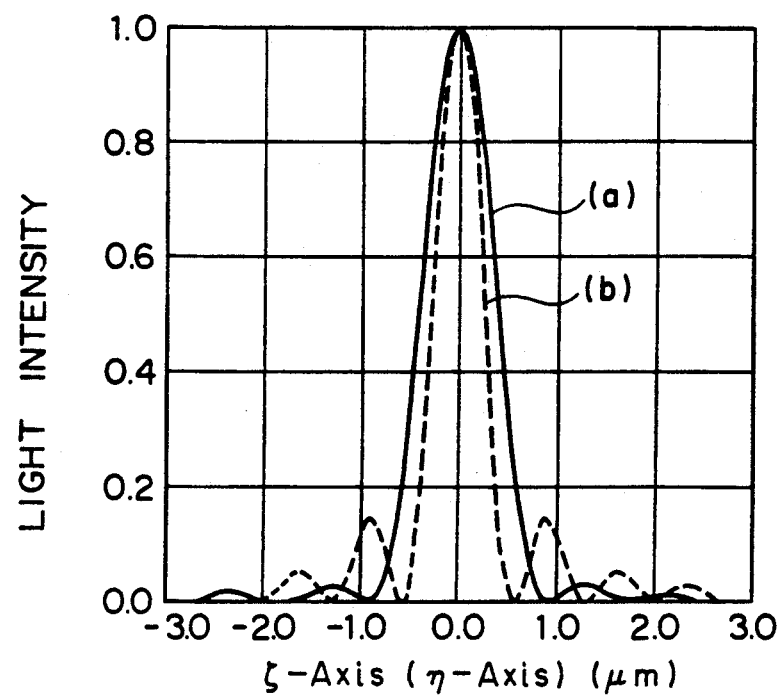
FIG. 2 shows the light intensity distribution on the optical disc reflecting surface.

Also, when the aperture is of a ring-band shape and the light intensity distribution is as shown by the curve (b) in FIG. 2, the cross-talk level is $-34$ dB, or sufficiently lower than $-30$ dB even if an adjacent mark is present at the side lobe peak position. As to the main lobe, $(\xi_\phi^2+\eta_\phi^2)^{\frac{1}{2}}\geq 0.39$ $\mu$m should be satisfied in order to achieve $-30$ dB or below of cross-talk.

Thus, as compared with the same condition as in the conventional art, or $d_D=0.95$ $\mu$m, the limit of the track density and line density can be compressed up to 0.87 $\mu$m, and thus the feature of the ring-band shaped aperture which could not be used in the prior art can be effectively utilized.

In general, the reflected light from the signal mark of $\phi_s\neq 0$ is easy to scatter, and thus the light distribution of the reflected light extends out of the aperture (or the region of the ring-band shaped grating coupler 4B), particularly entering into the inner circular region, within the ring band. Therefore, when the signal marks are designed under the conditions of Eqs. (10) and (11), the cross-talk of the signal can be reduced, but most of the signal component of the reflected light is collected in the inner circular region within the coupler 4B, with the result that the amount of detected light is reduced, resulting in low signal quality (C/N).

Thus, according to this embodiment, by forming the coupler 4A within the inner circular region of the coupler 4B, it is possible to convert the reflected light of this region into wave-guided light and detect it, and thus both the improvement of signal quality (C/N) and removal of cross-talk can be achieved.

Figure 6:
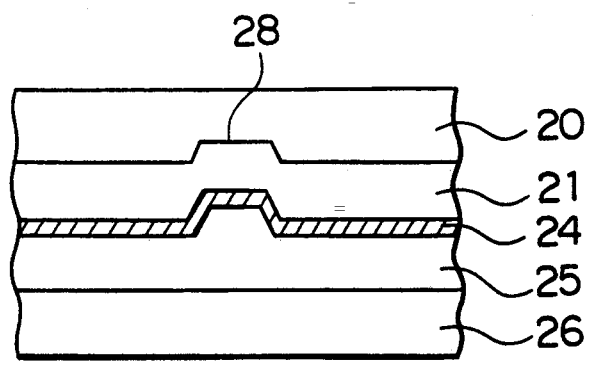
FIG. 6 is a cross-sectional diagram of the optical disc in another embodiment of the invention.

FIG. 6 is a cross-sectional diagram of the optical disc of another embodiment of this invention. The optical disc has formed on the surface of transparent base 20 a multi-layer film of the dielectric layer 21 and the reflecting layer 24, and the transparent base 26 cemented to the reflecting layer 24 with the adhering layer 25.

The transparent base 20 has formed on its surface pits 28 (signal marks) of a concave shape (or convex shape) as viewed from the transparent base 26, and thus the thickness of the dielectric layer 21 within the pit is different from that out of the pit. In other words, since in general the film forming speed is dependent on the surface shape of the formed film, and the concave region has a smaller field angle than the convex region as viewed from the deposited side, the film forming speed on the concave region is slow and thus the film thereon is thin.

Accordingly, the reflection function of the region within the pit to the incident light from the transparent base 20 side is different in phase and amplitude from that out of the pit. Thus, the thickness of the dielectric layer 21 within and out of the pit is controlled to satisfy Eqs. (10) and (11), so that the same effect as in the above embodiment can be achieved. In this embodiment, since the active layer with its optical constant changed by heat is not used, the optical disc is used only for reproduction, but it is simple in construction and easy to be produced as compared with the above embodiment.

The equation (12) for the input coupling of the reflected light into the wave-guiding layer is satisfied in other type of couplers than the coupler shown in this embodiment. Thus, even if the construction of the optical head is different from that of this embodiment, the cross-talk can be effectively removed as long as the reflected light from the optical disc is converted into wave-guided light by other means (the so-called coupler).

INDUSTRIAL APPLICABILITY

According to the optical disc apparatus of this invention, the signal cross-talk can be remarkably reduced and a high-density signal exceeding the diffraction limit of light can be reproduced.

We claim:

1. An optical apparatus comprising a laser source for emitting laser light of wavelength $\lambda$, an optical recording medium including a signal surface having signal marks formed thereon, and coupling means for receiving and focusing said laser light of wavelength $\lambda$ on said signal surface, receiving reflected light from said signal surface and converting it into wave-guided light, wherein the equation of $$(A_s \cos \phi_s - 1) \geq -D_s(A_s^2 - 2A_s \cos \phi_s - 1)^2 / 4\lambda^2$$

or $$A_s \cos \phi_s = 1$$

is satisfied by said recording medium where $A_s$ and $\phi_s$ are the amplitude reflectivity ratio and the phase difference between the regions within and out of said signal mark, and $D_s$ is the area of said signal mark.

2. An optical apparatus according to claim 1, wherein said coupling means is formed of a concentric circular or spiral periodic structure on a wave-guide layer in which said wave-guided light is propagated.

* * * * *